United States Patent [19]

Perkins

[11] Patent Number: 4,765,485
[45] Date of Patent: Aug. 23, 1988

[54] RE-USABLE MAILER PACKAGE

[75] Inventor: William Perkins, Etobicoke, Canada

[73] Assignee: Reid Dominion Packaging Limited, Mississauga, Canada

[21] Appl. No.: 53,756

[22] Filed: May 26, 1987

[51] Int. Cl.⁴ .............................................. B65D 27/34
[52] U.S. Cl. ...................................... 206/610; 229/74; 229/84
[58] Field of Search ...................... 229/80, 82, 84, 74; 206/610

[56] References Cited

U.S. PATENT DOCUMENTS

| | | | |
|---|---|---|---|
| 1,378,903 | 5/1921 | Schoreck | 229/74 |
| 2,182,261 | 12/1939 | Maas | 229/80 |
| 2,318,997 | 5/1943 | Hopkins | 229/74 |
| 2,345,793 | 4/1944 | Chapel | 206/610 |

FOREIGN PATENT DOCUMENTS

| | | | |
|---|---|---|---|
| 659043 | 6/1929 | France | 206/610 |
| 1483501 | 4/1967 | France | 229/80 |
| 3490 | of 1892 | United Kingdom | 229/84 |
| 6088 | of 1905 | United Kingdom | 229/80 |
| 217128 | 6/1924 | United Kingdom | 229/84 |
| 1340728 | 12/1973 | United Kingdom | 229/84 |

Primary Examiner—Stephen P. Garbe
Attorney, Agent, or Firm—Fetherstonhaugh and Co.

[57] ABSTRACT

A paperboard mailing envelope of the type having an interlocking tongue and slot formed one on the closure flap and one on the back panel. The tongue and slot are adapted to interlock to prevent undetected withdrawal of the locking tongue from the slot. A detachable tear strip margin is provided on each of the front and back panels. The margins connect adjacent side edges of the front and back panels. The detachable tear strip margins are severable from their associated panels along weakened tear lines to provide an unloading opening through which the contents of the envelope may be removed.

8 Claims, 3 Drawing Sheets

RE-USABLE MAILER PACKAGE

This invention relates to envelopes. In particular, this invention relates to paperboard mailing envelopes of the type commonly used by courier services.

PRIOR ART

Difficulty has been experienced in attempting to provide a paperboard envelope which can be used by courier services which is inexpensive and tamperproof. In the most common form of envelope presently used, the closure flap is coated with a pressure-sensitive adhesive and a temporary cover strip is applied to the flap to cover the adhesive until the envelope is to be sealed.

The application of a pressure-sensitive adhesive and a temporary cover strip to the flap of the conventional paperboard envelope is an expensive procedure. Furthermore, pressure-sensitive adhesives are not considered to be tamper-proof when applied between two layers of paperboard. In many situations, it is possible to open the seal formed between two layers of paperboard and to re-seal after opening when a pressure-sensitive adhesive is used. This is particularly true when the pressure-sensitive adhesive is cool. In addition, because paperboard has a substantial strength, it is possible to pry one layer of paperboard away from another layer in order to open the seal formed by a pressure sensitive adhesive without the opening being detectable when the seal is re-established.

In addition, the conventional paperboard envelope which has a flap which is sealed by a pressure-sensitive adhesive is not suitable for any other use with the result that after it has been used as an envelope, it is discarded.

It is an object of the present invention to provide a paperboard envelope which has a closure flap which can be locked in the closed position to provide a tamper-proof seal without requiring the use of a pressure-sensitive adhesive.

It is a further object of the present invention to provide a paperboard envelope which has a closure flap for closing the loading opening and a tear strip which is removable to provide a removal opening.

It is yet another object of the present invention to provide a shipper package which includes an envelope which has a closure flap which extends in a face-to-face overlying relationship with one of the side panels of the envelope and a bill of lading package adhesively applied to the envelope and extending to bridge between the closure flap and the side wall panel of the envelope in order to seal the flap in its closed position in use.

It is yet another object of the present invention to provide a paperboard mailing envelope which after its use as a mailing envelope may be used as a file folder.

According to one aspect of the present invention, there is provided in a paperboard mailing envelope of the type having front and back panels which are interconnected to form a pouch which has a loading opening at one end thereof and a closure flap hingedly connected to the front panel, the closure flap being operable to extend across the loading opening to overlie the back panel and close the loading opening in use, the improvement of an interlocking tongue and slot formed one on the closure flap and one on the back panel, the tongue and slot being adapted to interlock to prevent undetected withdrawal of the locking tongue from the slot in use, and a detachable tear strip margin on each of said front and back panels connecting adjacent side edges of the front and back panels, said detachable tear strip margins being severable from their associated panels along weakened tear lines to provide an unloading opening through which the contents of the envelope may be removed in use.

According to a further aspect of the present invention, there is provided a shipper package which comprises an envelope comprising an envelope comprising a front and back panel connected to one another to form a shipping compartment which has a loading opening at one end thereof, a closure flap connected to said front panel and extending across the loading opening and being secured to the back panel in a face-to-face relationship, and a bill of lading package having a back face which is coated with a pressure-sensitive adhesive, the back face of said bill of lading package being secured to said envelope with a portion thereof secured to the back panel and a portion thereof secured to the closure flap such that the bill of lading package bridges between the closure flap and back panel to prevent removal of the closure flap without detectable damage to the bill of lading package.

The invention will be more clearly understood after reference to the following detailed specification read in conjunction with the drawings wherein.

Figure 1:
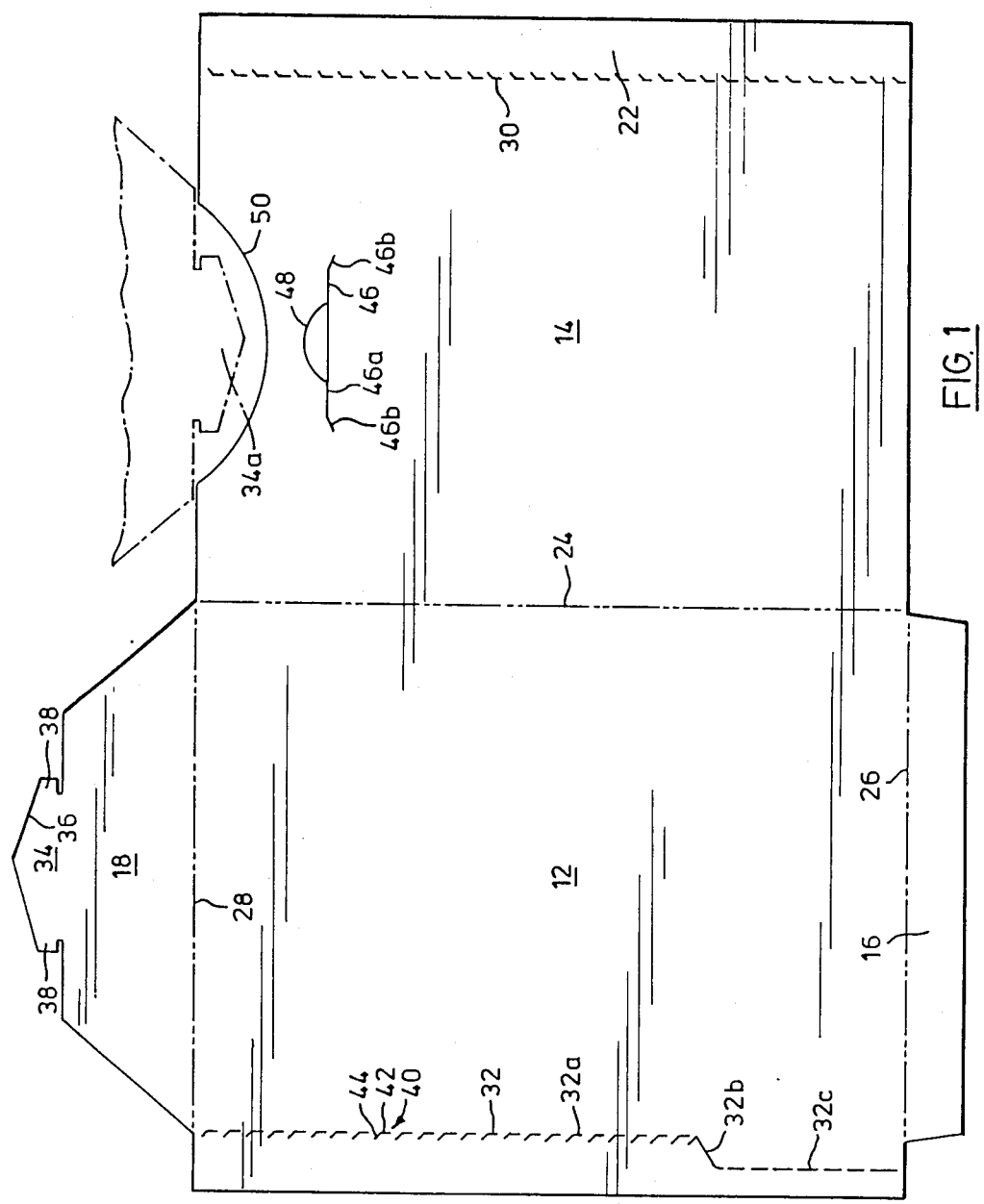
FIG. 1 is a plan view of a blank constructed in accordance with an embodiment of the present invention.

With reference to FIG. 1 of the drawings, the reference numeral 10 refers generally to a blank suitable for use in forming a carton according to an embodiment of the present invention.

The blank 10 includes a front panel 12, a back panel 14, a bottom closure flap 16, a top closure flap 18 and first and second detachable tear strip margins 20 and 22. The front panel 12 is hingedly connected to the back panel 14 along a hinge line 24. The bottom closure flap 16 is hingedly connected to the front panel 12 along the hinge line 26. The top closure flap 18 is hingedly connected to the front panel 12 along the hinge line 28.

The second tear strip margin 22 is connected to the back panel 14 along the a weakened tear line 30. The weakened tear line 30 is formed from a plurality of longitudinally spaced perforations arranged in a zipper pattern and extends in a generally straight line between the upper and lower edges of the back panel 14. The first tear strip margin 20 is connected to back panel 12 along a weakened tear line 32. The weakened tear line 32 has a portion of its length 32a which extends in a straight line from the upper edge of the first tear strip margin 22, an obliquely inclined portion 32b followed by a longitudinally extending portion 32c. The portion 32a is formed with a plurality of longitudinally spaced perforations arranged in a zipper pattern. The perforation which is formed along the obliquely inclined portion 32b is an obliquely inclined perforation and the perforations formed along the portion 32c extend longitudinally thereof.

The type of perforation required to provide a "zipper pattern" is well known and is commonly used to provide removable tear strips in cartons and the like. Each perforation 40 includes a longitudinally extending portion 42 and an obliquely extending portion 44. The obliquely extending portions are inclined in a direction opposite to the direction in which the strip is to be torn when being removed.

The top closure flap 18 is formed with a tongue 34 which has a V-shaped leading edge 36. Locking lugs 38 project laterally at either side of the locking tongue 34.

A locking slot 46 is formed in the back panel 14. The locking slot 46 has a transversely extending portion 46a and a pair of angularly inclined end portions 46b. An arcuate-shaped notch 48 is formed above the center of the width of the transversely extending portion 46a. The transverse width of the locking slot 46 is proportioned so as to be slightly undersize with respect to the transverse width of the locking tongue 34 such that when the locking tongue 34 is inserted into the slot 46, the locking lugs 38 will interlock with the back panel to prevent undetected removal of the locking tongue. While it would be possible to forcibly withdraw the locking tongue from the slot without a great deal of difficulty, the locking tongue and/or the back panel surrounding the locking slot would be so mutilated that the fact that the tongue had been withdrawn would be clearly visible to anyone examining the package.

For the purposes of facilitating the loading of the envelope, an arcuate-shaped notch 50 is provided along the upper edge of the back panel 14. The material removed to form the notch 50 can be used to produce locking tongues 34 of identical blanks cut from a large sheet of paperboard by nesting adjacent blanks. The outline of the tongue of an adjacent blank is shown and identified as tongue 34a.

Figure 2:
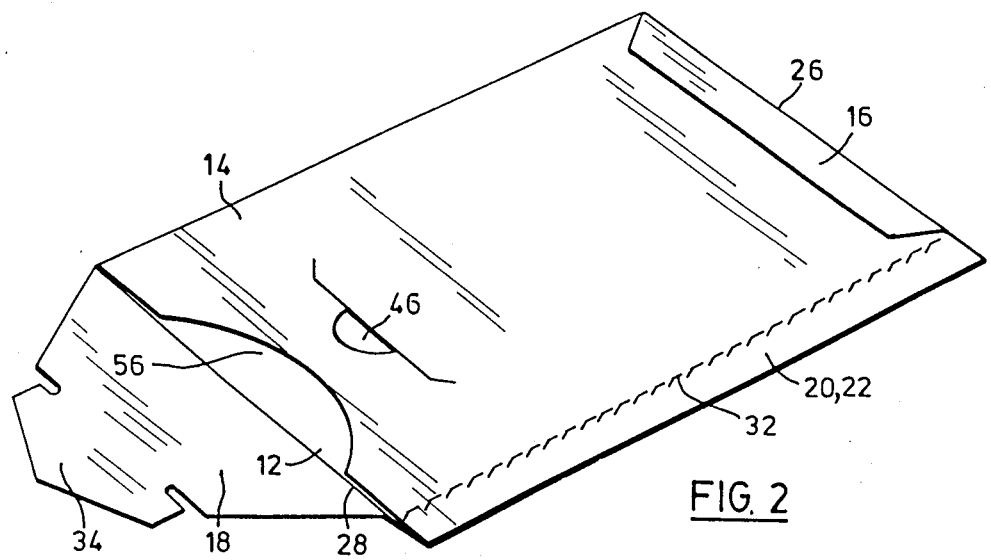
FIG. 2 is a pictorial view of the assembled blank of FIG. 1 with the envelope in the open position.

In order to assemble the blank of FIG. 1 to provide the envelope illustrated in FIG. 2, adhesive is applied to the inner face of the first tear strip margin 20. The adhesive extends across the full face of the margin 20 to the weakened tear line 32. A similar adhesive coating is applied to the bottom closure flap 16. The blank 10 is then folded along the hinge line 24 to locate the second tear strip margin 22 in a face-to-face relationship with respect to the first tear strip margin 20 to adhesively secure the tear strip margins 20 and 22 in a face-to-face relationship. To complete the forming of the envelope, the bottom closure flap 16 is folded inwardly along the hinge line 26 and is adhesively secured to the back panel 14.

Figure 5:
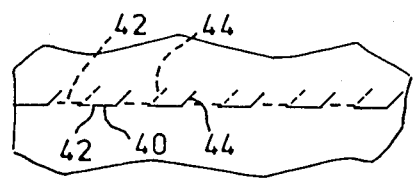
FIG. 5 is an enlarged detail view of the tear strip perforations.

It will be noted that the perforations 40 formed along the weakened tear line 30 are longitudinally offset with respect to the perforations 40 formed along the weakened tear line 32. The feature is shown in FIG. 5 of the drawings.

Figure 3:
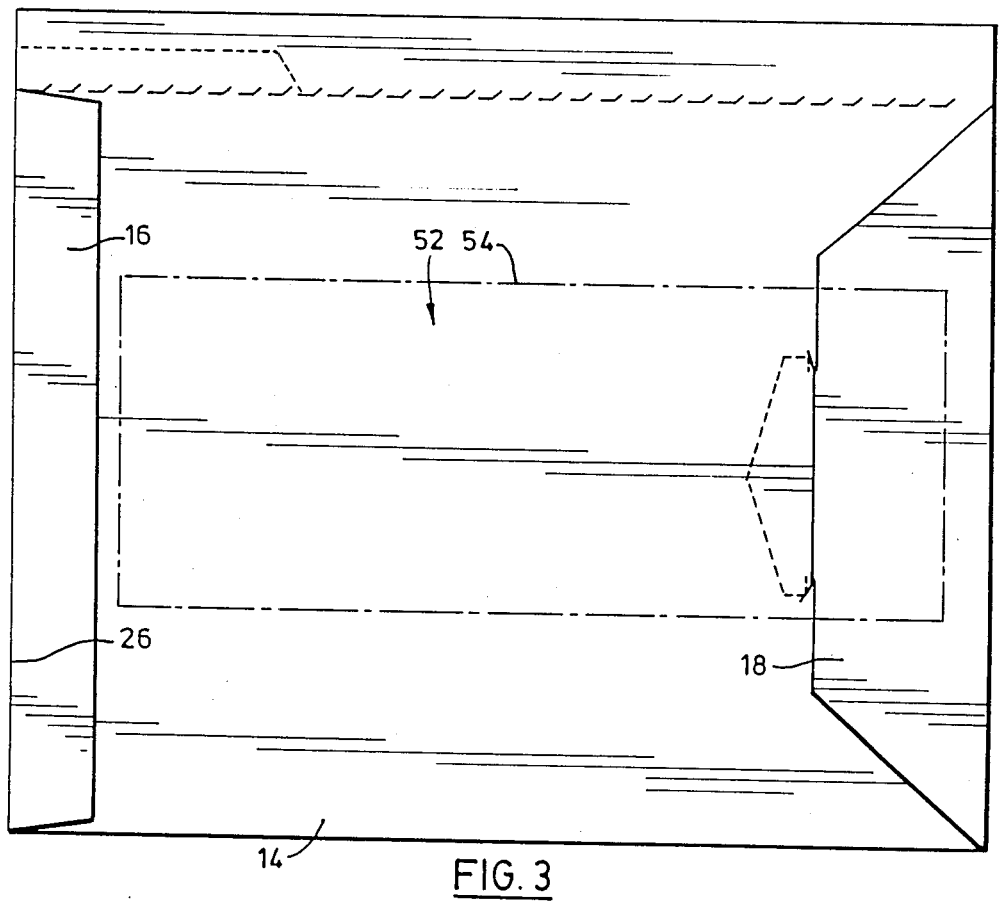
FIG. 3 is a plan view of the envelope in the closed position.

A target area generally identified by the reference numeral 52 (Fig.3) is formed by a printed outline 54 applied to the back panel 14 and instructions are printed thereon to direct the user to apply the bill of lading to the target area 52. In use, the items which are to be shipped in the envelope are loaded into the compartment 56 which is formed between the front panel 12 and the back panel 14. It will be noted that the compartment 56 extends to but not beyond the weakened tear line 32 with the result that the items which are housed in the compartment 56 will be laterally spaced from the tear line 32 so as not to be damaged when the tear strips 20,22 are removed.

When the envelope is to be used, the goods which are to shipped are loaded into the compartment 56 and the top closure flap 18 is folded along the hinge line 28 and the tongue 34 is inserted into the slot 46. This is the position shown in FIG. 3 of the drawings. As previously indicated, the tongue 34 is oversized with respect to the slot 36 and gains entry to the slot by bending slightly. As previously indicated, the locking lugs 38 will prevent the withdrawal of the locking tongue 34 from the slot 46 without one or other of the tongue 34 or slot 46 being so mutilated as to make the fact that the tongue has been withdrawn clearly visible.

When the envelope has been closed as described above, the conventional bill of lading package 60 is applied to the target area 52. The conventional bill of lading package 60 includes a thin web 62 of plastic material which has a pressure sensitive adhesive applied to its inner face. This thin web 64 is applied to the target area 52 such that a portion thereof is secured to the back panel 14 and a portion thereof is secured to the closure flap 18 such that it bridges between the closure flap and the back panel to prevent removal of the closure flap without detectably damaging the bill of lading package. The layer of plastic materials 62 which forms the adhesive portion of the bill of lading package is so thin that once it is applied the force required to peel it away from the surface to which it is applied is greater than required to stretch the plastic material from which it is made and consequently, it is not possible to remove this plastic layer without damaging it to the extent that the fact it has been tampered with will be readily apparent.

Figure 4:
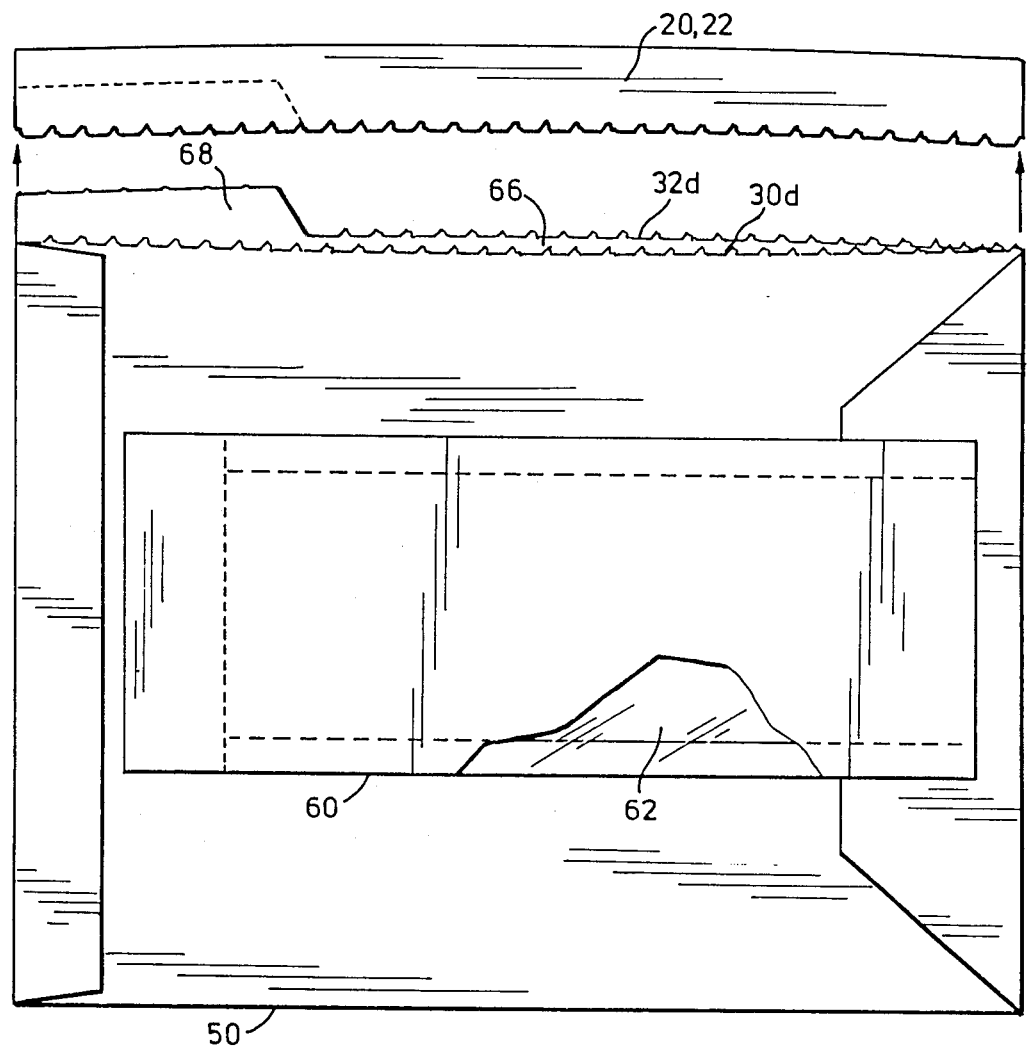
FIG. 4 is a pictorial view showing the removal of the tear strip to open the envelope.

As shown in FIG. 4 of the drawings, when the shipper package reaches its destination, the contents are removed by removing the tear strip 20, 22 from the weakened tear lines 30 and 32. When the tear strip 20, 22 is removed, the contents of the package may be removed through the discharge opening 66. It will be noted that an indexing tab 68 is formed along the edge 32d which will project above the edge 30d. The fact that the envelope 50 now has a discharge opening 66 which extends along a side edge thereof, permits this envelope to be used as a file folder of folio of the type which can be stored in conventional office filing drawers. As a result, the shipper package of the present invention is reusable as a file folio and thus has added advantages over the conventional envelopes which are normally scrapped after each delivery.

As previously indicated and as shown in FIG. 5 of the drawings, the perforations 40 formed along the weakened tear line 30 are longitudinally offset with respect to the perforations 40 formed along the weakened tear line 32. As a result, the margin 20, 22 has a greater resistance to flexing or bending along the weakened tear lines 30 and 32 than it would have if the perforations were aligned. The misalignment of the weakened tear lines 30 and 32 does, however, serve to minimize the tearing resistance because tearing will occur alternately along the unsevered portions of the weakened tear lines 30 and 32 rather than simultaneously.

From the foregoing, it will be apparent that the paperboard mailing envelope of the present invention is simple and inexpensive to manufacture and provides a tamper-proof lock which can prevent unauthorized examination of the contents of the package in use. In addition, the paperboard mailing envelope of the present invention can be reused as a file storage folio after it has been opened to permit removal of the items which are shipped therein when it is used as a mailing envelope.

These and other advantages of the paperboard mailing envelope of the present invention will be apparent to those skilled in the art.

I claim:

1. In a paperboard mailing envelope of the type having front and back panels which are interconnected to form a load storage compartment with a pouch which has a loading opening at one end thereof and a closure flap hingedly connected to the front panel, the closure flap being operable to extend across the loading opening to overlie the back panel and close the loading opening in use, the improvement of;
   (a) an interlocking tongue and slot formed one on the closure flap and one on the back panel, the tongue and slot being adapted to interlock to prevent undetected withdrawal of the locking tongue from the slot in use, and
   (b) a detachable tear strip margin on each of said front and back panels connecting adjacent side edges of the front and back panels, said detachable tear strip margins being bonded to one another in a face-to-face relationship to seal an edge of the pouch and form a tear strip from only two thickness of paperboard, the tear strip being located laterally outwardly from the load storage compartment, said detachable tear strip margins being severable from their associated panels along weakened tear lines which extend along an edge of the tear strip and are located laterally outwardly from said closure flap such that it is only necessary to tear through the thickness of the front and back panels in order to tear along the tear line to remove the tear strip to provide an unloading which extends the full length of one side edge of the pouch through which the contents of the envelope may be removed in use.

2. A paperboard mailing envelope as claimed in claim 1, wherein the weakened tear lines are in the form of a plurality of longitudinally spaced perforations arranged in a zipper pattern.

3. A paperboard mailing envelope as claimed in claim 1, wherein the perforations formed along the tear lines connecting a first of said tear strip margins to the front panel are longitudinally offset with respect to the perforations formed between a second of the tear strip margins and the back panel to minimize the flexibility of the connections formed between the tear strip margins and their associated panels while also minimizing tear resistance.

4. A paperboard mailing envelope as claimed in claim 1, wherein a first of said tear strip margins is connected to a side edge of said front panel along a first of said weakened tear lines and a second of said tear strip margins is connected to a side edge of the back panel along a second of said weakened tear lines, said weakened tear lines directly underlying one another along a major portion of their length, one of said tear lines having a minor portion of its length laterally offset with respect to the other of said tear lines to form an index tab projecting laterally from said other tear line such that the tear strip margins may be detached to form the unloading opening and the index tab in one tearing strip.

5. A paperboard mailing envelope as claimed in claim 1, wherein the front and back panels are hingedly connected to one another at their side edges which are remote from the tear strip margins and wherein a bottom closure flap is hingedly connected to the front wall and secured in a face-to-face relationship with respect to the back wall to close the bottom end of the envelope.

6. A paperboard mailing envelope as claimed in claim 1, wherein said slot is formed in the back panel and said tongue is formed at a distal end of the closure flap, said tongue being oversized with respect to the slot and being formed with locking lugs which interlock with edges of the slot to be retained therein as aforesaid.

7. A shipper package comprising;
   (a) an envelope comprising a front and back panel connected to one another to form a shipping compartment which has a loading opening at one end thereof, a closure flap connected to said front panel and having a sufficient width to extend across the loading opening and being secured to the back panel in a face-to-face relationship, and
   (b) a bill of lading package having a back face which is coated with a pressure-sensitive adhesive, the back face of said bill of lading package being secured to said envelope with a portion thereof secured to the back panel and a portion thereof secured to the closure flap centrally of the width thereof, said lading package having a width which is at least equal to one third the width of the closure flap and such that the bill of lading package bridges between the closure flap and back panel to prevent removal of the closure flap or goods from the package without detectable damage to the bill of lading package.

8. A courier envelope comprising;
   (a) a paperboard front panel having oppositely disposed first and second side edges and oppositely disposed first and second end edges,
   (b) a paperboard back panel having oppositely disposed first and second side edges and oppositely disposed first and second end edges, the first side edges of the front and back panels being hingedly connected to one another to form a pouch which has a load storage compartment formed therein which has a loading opening at one end thereof,
   (c) a first tear strip margin connected to the second side edge of the front panel along a first tear line formed with a plurality of longitudinally spaced zipper perforations,
   (d) a second tear strip margin connected to the second edge of the back panel along a second tear line formed with a plurality of longitudinally spaced zipper perforations, said first and second tear strip margins being secured to one another in a face-to-face relationship to provide a sealed tamper-proof tear strip from only two thicknesses of paperboard along said first side edges of said front and back panels,
   (e) a locking passage opening through said back panel adjacent said first end edge,
   (f) a closure flap having a proximal end and a distal end, the proximal end of the closure flap being hingedly connected to said first end edge of said front panel and being operable to extend across the full width of the loading opening,
   (g) a locking tongue formed at the distal end of said closure flap, said locking tongue being arranged to project into said locking passage and adapted to interlock therewith in use to secure the closure flap in a position closing a loading passage at said first end edges of said front and back panels,
   (h) said tear strip being located laterally outwardly from said closure flap such that it is only necessary to tear through the thickness of the front and back bond in order to separate the tear strip from these panels along the tear line.

* * * * *